United States Patent [19]

Caruso, Jr. et al.

[11] Patent Number: 5,498,024
[45] Date of Patent: Mar. 12, 1996

[54] INFLATABLE RESTRAINT ASSEMBLY

[75] Inventors: Charles P. Caruso, Jr., Bountiful; Michael J. Ward, Liberty, both of Utah

[73] Assignee: Morton International, Inc., Chicago, Ill.

[21] Appl. No.: 516,366

[22] Filed: Aug. 17, 1995

[51] Int. Cl.⁶ .................................................. B60R 21/16
[52] U.S. Cl. ............................... 280/728.2; 280/732
[58] Field of Search ........................ 280/732, 743.1, 280/728.2, 728.1; 220/666, 675, 676

[56] References Cited

U.S. PATENT DOCUMENTS

| | | | |
|---|---|---|---|
| 4,941,678 | 7/1990 | Lauritzen et al. | 280/732 |
| 5,058,919 | 10/1991 | Paquette et al. | 280/732 |
| 5,074,584 | 12/1991 | Jarboe | 280/732 |
| 5,096,222 | 3/1992 | Komerska et al. | 280/732 |
| 5,195,775 | 3/1993 | Komerska et al. | 280/73 |
| 5,217,254 | 6/1993 | Satoh | 280/732 |
| 5,284,358 | 2/1994 | Rhein | 280/728 A |
| 5,332,256 | 7/1994 | Lauritzen et al. | 280/728 A |
| 5,342,082 | 8/1994 | Knska et al. | 280/732 X |
| 5,346,248 | 9/1994 | Rhein et al. | 280/728 R |
| 5,351,987 | 10/1994 | Donegan et al. | 280/728.2 |
| 5,407,226 | 4/1995 | Lauritzen et al. | 280/728 R |
| 5,407,227 | 4/1995 | Lauritzen et al. | 280/728 R |
| 5,425,550 | 6/1995 | Paxton et al. | 280/732 X |
| 5,431,432 | 7/1995 | Wehler et al. | 280/745.1 X |
| 5,431,436 | 7/1995 | Mossi et al. | 280/732 X |
| 5,435,596 | 7/1995 | Rose et al. | 280/728.2 |

FOREIGN PATENT DOCUMENTS 4318277  12/1993  Germany ........................ 280/728.2

*Primary Examiner*—Christopher P. Ellis
*Attorney, Agent, or Firm*—Nick C. Kottis; Gerald K. White

[57] ABSTRACT

Featured for use as a part of an inflatable restraint system is a reaction canister assembly with a body part and frame structure that reduces and/or minimizes the number of component parts, including fasteners, incorporated therein.

17 Claims, 4 Drawing Sheets

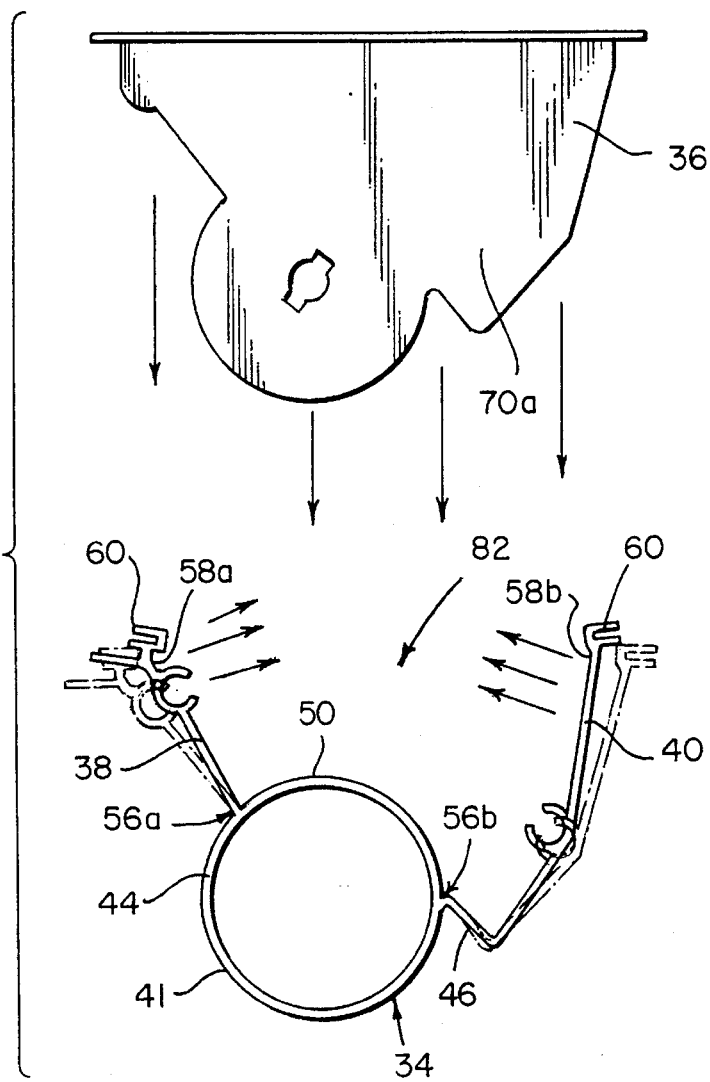
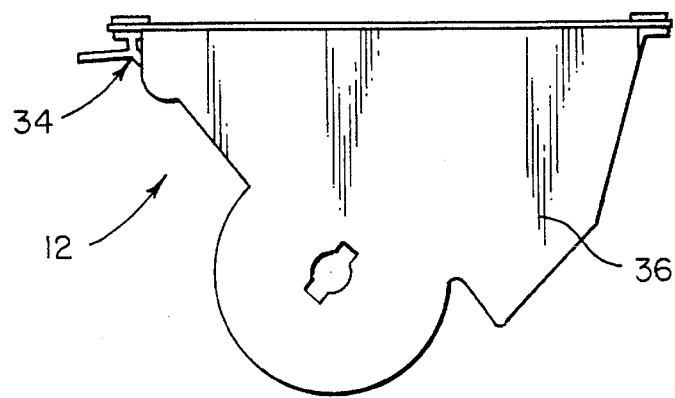
FIG. 3A
FIG. 3B

INFLATABLE RESTRAINT ASSEMBLY

BACKGROUND OF THE INVENTION

This invention relates generally to inflatable passive restraint systems such as used in motor vehicles to restrain the movement of a seated occupant during a collision and, more particularly, to the assembly of such an inflatable passive restraint system.

Safety restraint systems which self-actuate from an undeployed to a deployed state without the need for intervention by the operator, i.e., "passive restraint systems", and particularly those restraint systems incorporating inflatable bags or cushions, as well as the use of such systems in motor vehicles have gained general appreciation.

It is well known to protect a vehicle occupant using a cushion or bag that is inflated with gas, e.g., an "airbag", when the vehicle encounters sudden deceleration, such as in the event of a collision. During deployment, the rapidly evolving gas with which the bag is typically filled is an inert gas, e.g., nitrogen. In such systems, the airbag is normally housed in an uninflated and folded condition to minimize space requirements. In an emergency, gas is discharged from an inflator to rapidly inflate the airbag. The airbag, upon inflation, serves to restrain the movement of the vehicle occupant as the collision proceeds. In general, such airbags are commonly designed to be inflated in no more than a few milliseconds.

Vehicular inflatable restraint systems generally include multiple crash sensors generally positioned about or mounted to the frame and/or body of the subject vehicle and serve to sense sudden decelerations of the vehicle. In turn, the sensor sends a signal to an airbag module or assembly strategically positioned within the riding compartment of the vehicle to actuate deployment of the airbag. In general, an airbag provided for the protection of a vehicle driver, i.e., a driver side airbag, is mounted in a storage compartment located along the steering column of the vehicle.

Typical inflatable cushion restraint systems make use of an airbag module which generally includes an outer reaction housing or canister, commonly referred to as a "reaction can" or, more briefly, as a "can". The reaction canister generally serves to support or contain other components of the airbag module system, including what is referred to as a "airbag inflator" or, more briefly, as an "inflator", or, alternatively, as a "generator". The inflator, upon actuation, acts to provide the gas to inflate the airbag/cushion.

The types of inflators typically used in such systems include pyrotechnic and hybrid inflators. Pyrotechnic inflators generally contain a gas generating material which, upon activation, generates gas used to inflate the airbag/cushion. In general, the inflation gas produced by a pyrotechnic inflator is emitted from openings or emission ports along the length of the inflator. In contrast, hybrid inflators in addition to a body of ignitable pyrotechnic material generally contain, as the primary inflation gas, a compressed gas which upon proper actuation is expelled from the inflator. As a consequence of the physics associated with the storage of compressed gases, the container used to store this compressed gas typically has a cylindrical shape.

Furthermore, the discharge of gas from such a cylindrically shaped gas storage container typically occurs by way of openings or emission ports at only one end of the cylindrical container. To attain proper bag deployment, however, it is generally desired that the emission of gas into the airbag/cushion from such a storage container be done in a fairly uniform manner. With typical airbag/inflator assemblies, such uniform emission is generally attained by having a relatively even emission of gas into the deploying bag along the length of the gas inlet opening of the bag connected, directly or indirectly, to the inflator. In this way the bag is properly uniformly deployed and the risk of the bag deploying in a skewed manner due to the discharge of gas from only one end of the storage container is avoided.

The reaction housing is typically in the form of an open-mouthed container, formed by one or more body parts with an end plate fastened at each opposed end of the container. Usually, the airbag/cushion, in an uninflated and folded condition, is also placed into such an open-mouth reaction canister housing. In practice, the component parts of such prior art inflatable restraining devices, particularly the component parts of the reaction canister, e.g., the body part or parts and two end plates, one at each opposite end and especially reaction canister assemblies utilizing part or parts formed by extrusion fabrication, are commonly joined and held together through the use of a multiple number of selected fasteners such as screws, rivets or bolts.

For example, a selected fastener is typically passed through fastener holes which have been preformed in the respective parts to be fastened together. The production of assemblies that utilize multiple fasteners typically require additional machinery and associated personnel. For example, facilities for the production of such assemblies requiring multiple fasteners commonly include fixture devices to effect proper fastener hole alignment for insertion of a fastener and some form of a driver device in order to drive the fastener into the fastener hole. Such additional production steps slow the assembly process and increase the costs associated with such assemblies.

Furthermore, each fastener is an entity in and of itself with each such fastener needing to be tightened to a specific torque, thereby complicating the assembly process. For example in order to better ensure safety in and proper functioning of airbag module assemblies, the component parts of the assembly, including fasteners, and the particulars of each such use of a component part is desirably recorded and tracked. Such recording and tracking operations, however, are undesirably complicated as the number of component parts of a particular assembly is increased. In view thereof, airbag module assemblies are generally preferably designed to minimize the number of component parts used therein.

Thus, a relatively simple, low cost reaction canister assembly which: 1) reduces and/or minimizes the number of component parts incorporated therein and 2) reduces and/or minimizes the use of fasteners such as rivets, bolts, and screws to effect attachment and the problems associated with the use of such fasteners, such as those identified herein, is desired.

SUMMARY OF THE INVENTION

A general object of the invention is to provide improvements to the assemblies and subassemblies used in inflatable passive restraint systems.

A more specific objective of the invention is to overcome one or more of the problems described above.

The general object of the invention can be attained, at least in part, through an inflatable restraint reaction canister which includes a one-piece trough shaped reaction canister body part and a one-piece reaction canister frame structure. The reaction canister body part is composed of a base portion, first and second opposite ends, and first and second opposite side walls continuously extending from the base portion. Each of the side walls have a first end at the base portion and a second end having a frame retaining notch extending along at least a portion thereof. The reaction canister frame structure includes opposed lateral first and second side flanges, opposed first and second end flanges each continuous with each of the first and second side flanges, and first and second opposed end caps angularly extending from the first and second end flanges, respectively. In the assembly of the body part with the frame structure, the frame retaining notch of each of the body part side walls is in mating engagement with a mating portion of the frame structure side flanges, securing the frame structure with the body part.

The prior art fails to provide a relatively simple, low cost reaction canister assembly which: 1) reduces and/or minimizes the number of component parts incorporated therein and 2) reduces and/or minimizes the use of fasteners such as rivets, bolts, and screws to effect attachment and the problems associated with the use of such fasteners, such as those identified herein.

The invention further comprehends a subassembly including such a reaction canister and an inflator device further coupling the reaction canister body part with the reaction canister frame structure and locking the body part and the frame structure in a coupled arrangement.

The invention still further comprehends an inflatable restraint system subassembly which includes: an extruded one-piece trough shaped reaction canister body part, a one-piece reaction canister frame structure and an elongated inflator device.

The extruded one-piece trough shaped reaction canister body part has first and second opposite ends and includes a continuous circumference tubular diffuser portion and first and second opposite side walls continuously extending from the tubular diffuser portion. Each of the side walls have a first end at the tubular diffuser portion and a second end with a frame retaining notch extending along at least a portion thereof.

The one-piece reaction canister frame structure includes opposed lateral first and second side flanges, opposed first and second end flanges each continuous with each of the first and second side flanges, and first and second opposed end caps angularly extending from the first and second end flanges, respectively.

In the assembly of the extruded one-piece trough shaped reaction canister body part with the one-piece reaction canister frame structure, the frame retaining notch of each of the body part side walls is in mating engagement with a mating portion of the frame structure side flanges, securing the frame structure with the body part.

Additionally, in the subassembly, the elongated inflator device is centered in the tubular diffuser portion of the extruded one-piece trough shaped reaction canister body part. The inflator device further couples the body part with the frame structure and locks the body part and the frame structure in a coupled arrangement.

As used herein, the phrase "thrust neutral" refers to the production by an inflator of zero thrust when initiated as, for example, during a deployment event or accidentally during shipping, storage, or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

Further, references to inflators as "directional" are to be understood to refer to the production by an inflator of a resulting directional thrust when initiated as, for example, during a deployment event or accidentally during shipping, storage, or handling thereof. That is to say, the gas discharge openings in the inflator are so positioned that the gas is discharged in one or more directions whereby a resulting force may occur which would tend to cause physical movement of the inflator were not some restraining mechanism incorporated into the assembly.

Other objects and advantages will be apparent to those skilled in the art from the following detailed description taken in conjunction with the appended claims and drawings.

BRIEF DESCRIPTION OF THE DRAWINGS

FIG. 3A is a simplified exploded end view of the reaction canister inflatable restraint system subassembly of FIG. 2.

FIG. 3B is a simplified end view of the reaction canister inflatable restraint system subassembly of FIG. 2.

DETAILED DESCRIPTION OF THE INVENTION

The present invention, as is described in more detail below, provides an improved inflatable restraint system reaction canister and inflatable restraint system subassembly for use in inflatable passive restraint systems for use in vehicles for restraining the movement of a seated occupant during a collision.

While the invention is described below with particular reference to a passenger side airbag module assembly for automotive vehicles including vans, pick-up trucks, and particularly automobiles, it is to be understood that the invention also has applicability for other types or kinds of airbag module assemblies including driver side and side impact airbag assemblies. With respect to automotive vehicles it will also be appreciated that due to usual physical differences between passenger, side impact and driver side airbag module assemblies, including the typical difference in size with passenger side airbags generally being much larger than those used in side impact and driver side assemblies, the invention has particular utility in passenger side airbag module assemblies.

Figure 1:
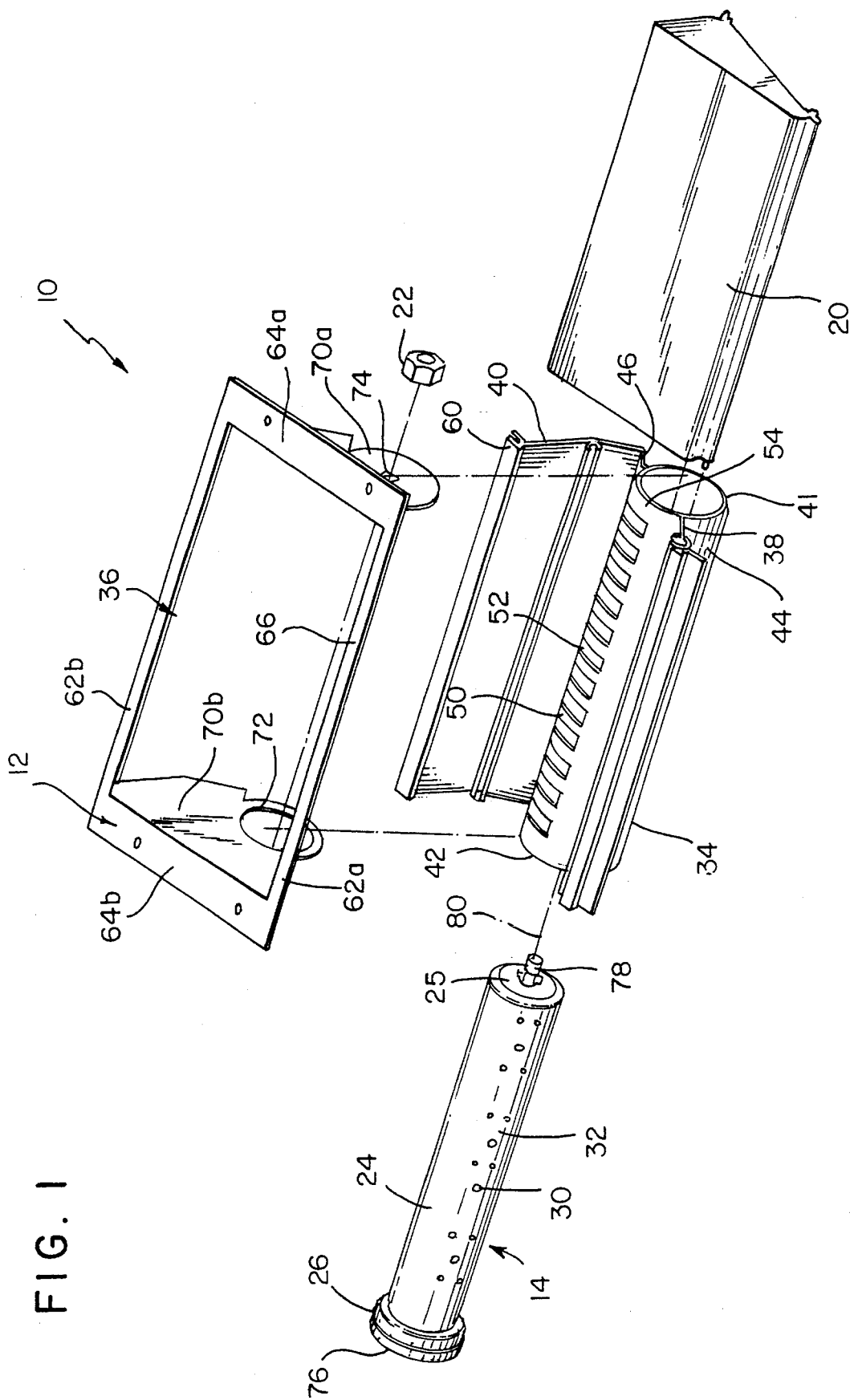
FIG. 1 is a simplified exploded perspective view of airbag module assembly in accordance with one embodiment of the invention.

Referring to the drawings and initially referring particularly to FIG. 1, there is illustrated an airbag module assembly, generally designated by the reference numeral 10. It is to be understood that in the practice of the invention, such an airbag module assembly is commonly housed in or secured to any appropriate cooperating portion of the vehicle. In the case of a passenger side module installation, such an assembly is normally housed in the instrument panel/dash board (not shown) of the vehicle opposite the passenger seat. In the case of a driver side module installation, such an assembly is typically housed in or secured to the steering wheel.

The assembly 10 includes a reaction canister assembly 12, an inflatable restraint system inflator 14, an airbag 20 and a nut 22 further securing the inflator 14 within the reaction canister assembly 12.

The inflator 14 includes a chamber portion 24 and first and second end portions 25 and 26, respectively. The inflator 14 also has gas exit vents or ports 30 along the circumference 32 of the inflator chamber 24 and arranged along the length thereof. By way of the gas exit ports 30, gas is discharged from the inflator chamber 24 and can be directed for inflation of the airbag 20.

Figure 2:
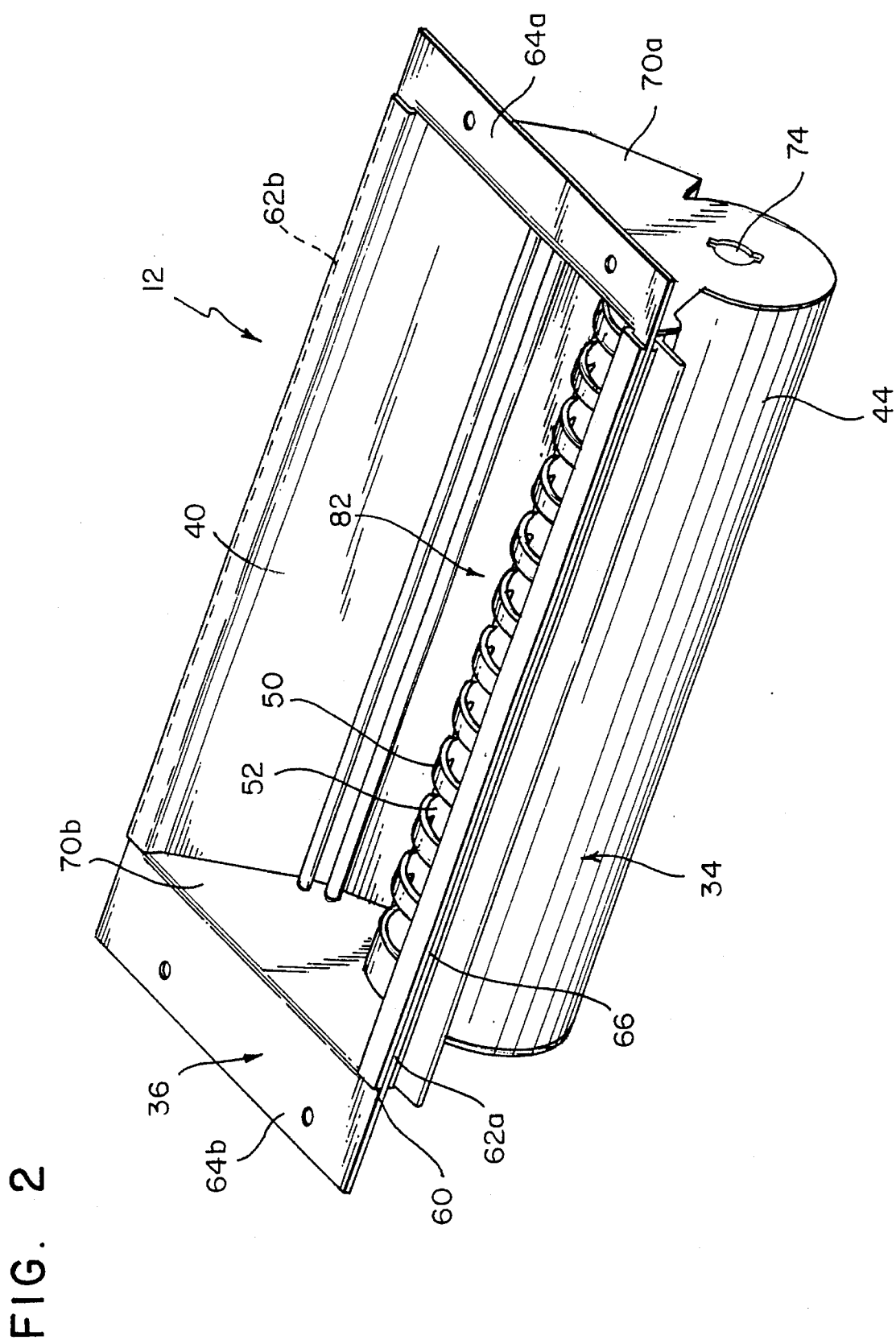
FIG. 2 is a simplified perspective view of a reaction canister inflatable restraint system subassembly in accordance with one embodiment of the invention.

The reaction canister assembly 12 is an inflatable restraint system subassembly which includes a one-piece extruded reaction canister body part 34, such as of aluminum, for example, and a one-piece reaction canister frame structure 36. As shown in FIGS. 1, 2 and 3A, the body part 34 has the general form of a long, narrow, open receptacle or trough and includes first and second opposite side walls or panels, e.g., a top side wall and a bottom side wall, 38 and 40, respectively, and first and second opposite ends, 41 and 42, respectively. The side walls are generally spaced apart and joined together by way of a body part bridging base portion 44, described in greater detail below. For example, the side walls 38 and 40 are preferably formed directly continuous with the integrally shaped base portion 44 or, as shown, continuously formed therewith via a side wall connecting portion 46.

The bridging base portion 44, e.g., that portion of the reaction canister body part 34 extending between and joining the respective side walls 38 and 40, is generally in the form of a continuous circumference tubular diffuser 50 wherein the chamber tube portion 24 of the inflator 14 is held in coaxial relation. Such a continuous circumference diffuser is specifically described in commonly assigned and herein fully incorporated U.S. Pat. No. 5,332,256, issued Jul. 26, 1994.

By the nature of such a tubular diffuser 50 being in surrounding relation with the inflator 14 disposed therein, thrust neutral inflators wherein the gas discharge openings 30 are positioned such that the gas is discharged in opposing directions whereby there are no resulting forces tending to cause physical movement of the inflator and hence, the inflator will expend the energy generated thereby, generally in place as well as directional inflators can be used therewith.

Spaced inflating gas exit ports or slots 52 are provided in the wall portion 54 of the diffuser tube 50 that faces the adjoining airbag 20.

Each of the side wall 38 and side wall connecting portion 46 have a first end 56a and 56b, respectively, at the base portion 44. Each of the side walls 38 and 40 have an opposed protruding second end 58a and 58b, respectively, having a frame retaining notch 60 extending along at least a portion thereof.

The reaction canister frame structure 36 includes opposed lateral first and second side flanges, 62a and 62b, respectively, and opposed first and second end flanges, 64a and 64b, respectively. As shown, the first end flange 64a is continuous with each of the first and second side flanges 62a and 62b. Similarly, the second end flange 64b is also continuous with each of the first and second side flanges 62a and 62b.

As perhaps best shown in FIGS. 2, 3A and 3B, in reaction canister assembly 12, the frame retaining notch 60 of each of the opposed body part side walls 38 and 40, respectively, fit in mating engagement with a mating portion 66 of the frame structure side flanges 62a and 62b, thereby securing the frame structure 36 with the body part 34.

The frame structure 36 additionally includes first and second opposed end caps 70a and 70b, respectively, angularly extending from the first and second end flanges 64a and 64b, respectively.

In order to allow the inflator 14 to be inserted into the diffuser 50 as a last operation in the assembly process, a circular opening 72 is provided in the second end cap 70b and a smaller keyed slot opening 74 is provided in the first end cap 70a. Also, as shown, a flange 76 is provided on the first end 25 of the inflator 14 and a threaded keyed stud 78, such as is common to such inflator devices, is provided on the second end 26 of the inflator 14. The size of the opening 72 is such as to allow the second end stud 78 to be inserted therein with the first end flange 76 mating about the opening 72 of the second end cap 70b.

Similarly, the size of the keyed opening 74 is such as snugly receive the stud 78. The arrangement is such that the relative angular position of the inflator 14 about the longitudinal axis 80 thereof and within the reaction canister body part 34 is determined by the keyed opening 74 and the keyed inflator stud 78. The nut 22 can be placed on the stud 78 so as to serve to hold the end caps 70a and 70b against first and second ends, 25 and 26, respectively, of the inflator 14.

In the illustrated embodiment, the side walls 38 and 40 are shown as being of different lengths, with the bottom side wall 40 being of a longer length than the top side wall 38. In general, it has been found that reaction canisters so shaped can more conveniently be incorporated within the dash board/instrument panel of automotive vehicles. It is to be understood, however, that the invention is not limited to use in conjunction with reaction canister side walls of such relative length. That is, the invention can similarly be used in conjunction with reaction canister body parts having side walls of similar lengths as well as reaction canister body parts wherein the length of the top side wall exceeds that of the bottom side wall.

In the reaction canister assembly 12 of the invention, the reaction canister body part side walls 38 and 40, respectively, are generally spaced apart and in conjunction with the end caps 70a and 70b, respectively, define an airbag retaining cavity, generally designated by the reference numeral 82, adjacently spaced from the inflator 14, see FIG. 2. The airbag 20, such as folded in a conventional manner, is housed within the cavity 82. In one preferred embodiment and as shown in the figures, the spaced apart side walls 38 and 40 are generally parallel to each other, ensuring a more uniformly shaped airbag retaining cavity and thereby reducing the possibility of the airbag housed within the cavity therebetween undesirably getting caught or snagged such as by a protruding surface or edge of the reaction canister body part. It is to be understood, however, that the side walls can be otherwise angularly positioned relative to one another as may be desired in specific applications, such as to permit the accommodation of the reaction canister into a specifically shaped dash board or instrument panel opening.

Figure 4A:
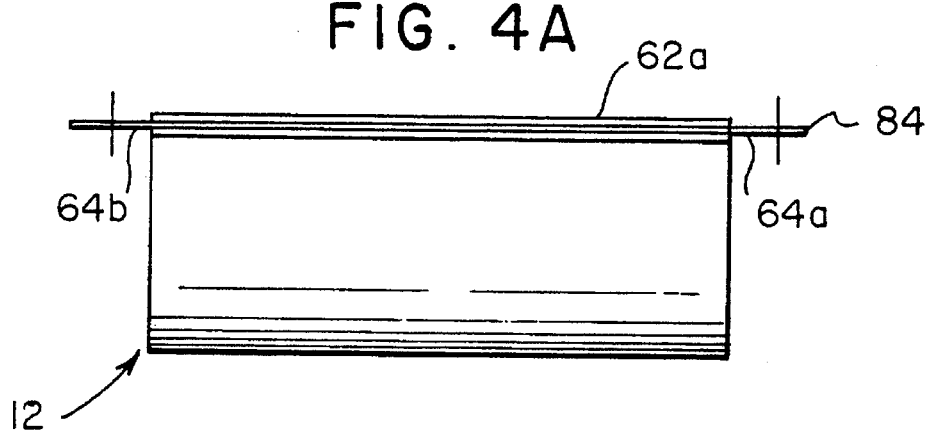
FIGS. 4A, 4B, and 4C, respectively, are side views of reaction canister inflatable restraint system subassemblies in accordance with alternative embodiments of the invention.
Figure 4B:
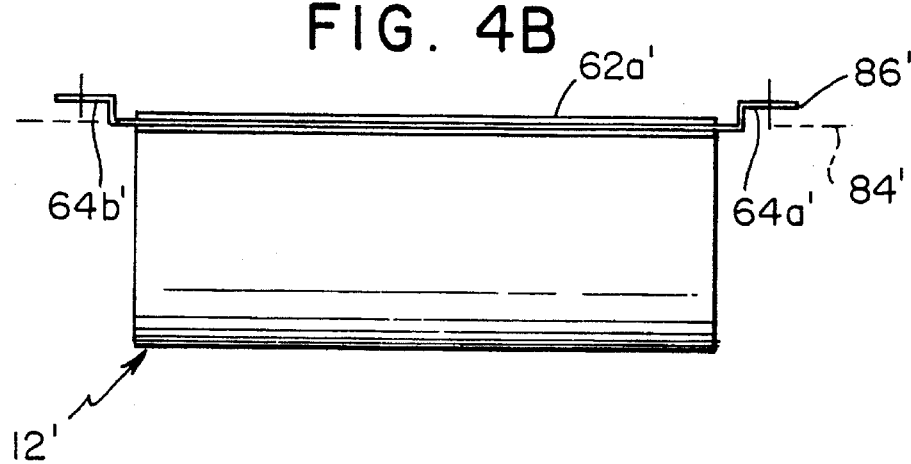
Figure 4C:
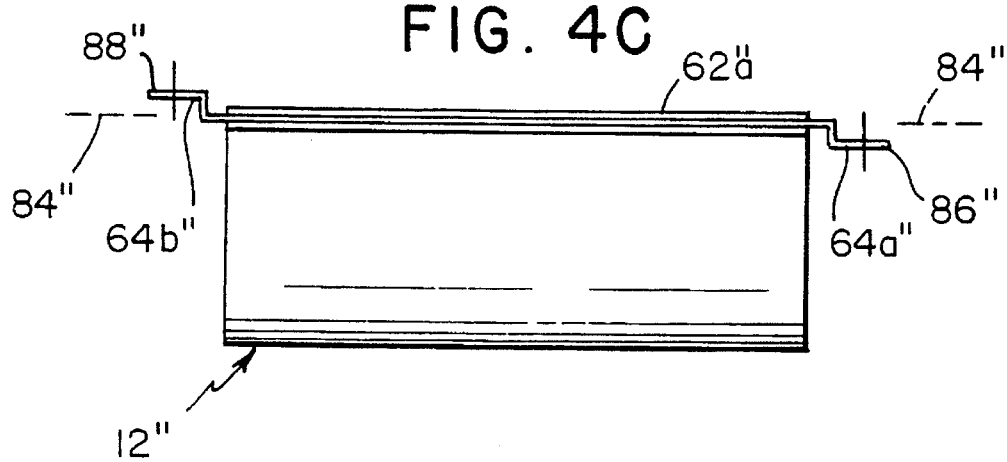

It is to be appreciated that the reaction canister assembly of the invention provides improved mounting flexibility as, for example, the side and end flanges of the reaction canister frame structure need not be entirely within the same plane. For example, the end flanges can be displaced to an elevated or lower plane than the corresponding side flanges. FIG. 4A illustrates the reaction canister assembly 12 of FIGS. 1, 2, 3A and 3B wherein the end flanges 64a and 64b are both in the same plane 84 as the side flanges 62a and 62b (not shown). FIG. 4B illustrates a reaction canister assembly 12', similar to the reaction canister 12 wherein, however, the first and second end flanges 64a' and 64b' are both displaced to an elevated plane 86' relative to the plane 84' of the side flanges (only side flange 62a' is shown). FIG. 4C illustrates a reaction canister assembly 12", similar to the reaction canister assembly 12 wherein, however, the first end flange 64a" is displaced to a lower plane 86" relative to the plane 84" of the side flanges (only side flange 62a" is shown) and the second end flange 64b" is displaced to an elevated plane 88" relative to the plane 84" of the side flanges.

Thus, while it will be appreciated that the planar arrangement of the reaction canister assembly 12 shown in FIG. 4A will typically be the simplest and least expensive as no additional bending processing is generally required, such other arrangements can be used, if desired, to meet the specific needs of particular applications.

While the invention has been shown and described above relative to a reaction canister assembly wherein the bridging portion of the body part is in the general form of a diffuser tube it is to be appreciated the other forms and types of body part bridging portions can be utilized in the practice of the invention. For example, a reaction canister body part incorporating a bridging portion in the form of an inflator chamber, such as described in U.S. Pat. No. 5,407,227, issued Apr. 18, 1995, the disclosure of which patent is fully herein incorporated, can, if desired, be used in the practice of the above-described invention.

Thus, the invention provides a relatively simple, low cost reaction canister assembly which: 1) reduces and/or minimizes the number of component parts incorporated therein and 2) reduces and/or minimizes the use of fasteners such as rivets, bolts, and screws to effect attachment and the problems associated with the use of such fasteners, such as those identified herein above.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An inflatable restraint system reaction canister comprising:
    a one-piece trough shaped reaction canister body part having a base portion, first and second opposite ends, and first and second opposite side walls continuously extending from the base portion, each of the side walls having a first end at the base portion and a second end having a frame retaining notch extending along at least a portion thereof, and
    a one-piece reaction canister frame structure including opposed lateral first and second side flanges, opposed first and second end flanges each continuous with each of the first and second side flanges, and first and second opposed end caps angularly extending from the first and second end flanges, respectively,
    wherein in the assembly of said body part with said frame structure, the frame retaining notch of each of the body part side walls is in mating engagement with a mating portion of the frame structure side flanges, securing said frame structure with said body part.

2. The reaction canister of claim 1 wherein said base portion comprises a tubular diffuser.

3. The reaction canister of claim 1 wherein said first and second side walls are spaced apart and in conjunction with said first and second end caps to define an airbag retaining cavity.

4. The reaction canister of claim 1 wherein said body part is formed by extrusion fabrication.

5. The reaction canister of claim 1 wherein said body part is formed of aluminum.

6. An inflatable restraint system subassembly comprising:
    a one-piece trough shaped reaction canister body part having a base portion, first and second opposite ends and first and second opposite side walls continuously extending from the base portion, each of the side walls having a first end at said base portion and a second end having a frame retaining notch extending along at least a portion thereof, and
    a one-piece reaction canister frame structure including opposed lateral first and second side flanges, opposed first and second end flanges each continuous with each of the first and second side flanges, and first and second opposed end caps angularly extending from the first and second end flanges, respectively,
    wherein in the assembly of said body part with said frame structure, the frame retaining notch of each of the body part side walls is in mating engagement with a mating portion of the frame structure side flanges, securing said frame structure with said body part, and
    with said subassembly additionally comprising an inflator device further coupling said body part with said frame structure and locking said body part and said frame structure in a coupled arrangement.

7. The inflatable restraint system subassembly of claim 6 wherein said base portion comprises a tubular diffuser wherein said inflator device is held in coaxial relation.

8. The inflatable restraint system subassembly of claim 6 wherein said inflator device is thrust neutral.

9. The inflatable restraint system subassembly of claim 6 wherein said inflator device is directional.

10. The inflatable restraint system subassembly of claim 6 wherein said first and second side walls are spaced apart and in conjunction with said first and second end caps to define an airbag retaining cavity.

11. The inflatable restraint system subassembly of claim 6 wherein said body part is formed by extrusion fabrication.

12. The inflatable restraint system subassembly of claim 6 wherein said body part is formed of aluminum.

13. An inflatable restraint system subassembly comprising:
    an extruded one-piece trough shaped reaction canister body part having first and second opposite ends and including a continuous circumference tubular diffuser portion and first and second opposite side walls continuously extending from the tubular diffuser portion, each of the side walls having a first end at the tubular diffuser portion and a second end having a frame retaining notch extending along at least a portion thereof, and
    a one-piece reaction canister frame structure including opposed lateral first and second side flanges, opposed first and second end flanges each continuous with each of the first and second side flanges, and first and second opposed end caps angularly extending from the first and second end flanges, respectively,
    wherein in the assembly of said body part with said frame structure, the frame retaining notch of each of the body part side walls is in mating engagement with a mating portion of the frame structure side flanges, securing said frame structure with said body part, and with said subassembly additionally comprising an elongated inflator device centered in the tubular diffuser portion, the inflator device further coupling said body part with said frame structure and locking said body part and said frame structure in a coupled arrangement.

14. The inflatable restraint system subassembly of claim 13 wherein said inflator device is thrust neutral.

15. The inflatable restraint system subassembly of claim 13 wherein said inflator device is directional.

16. The inflatable restraint system subassembly of claim 13 wherein said first and second side walls are spaced apart and in conjunction with said first and second end caps to define an airbag retaining cavity.

17. The inflatable restraint system subassembly of claim 13 wherein said body part is formed of aluminum.

* * * * *